United States Patent [19]

Danno et al.

[11] Patent Number: 4,520,272
[45] Date of Patent: May 28, 1985

[54] ENGINE SPEED REGULATING SYSTEM

[75] Inventors: Yoshiaki Danno; Hiroyuki Kobayashi; Toyoaki Fukui, all of Kyoto, Japan

[73] Assignee: Mitsubishi Jidosha Kogyo Kabushiki Kaisha, Tokyo, Japan

[21] Appl. No.: 461,178

[22] Filed: Jan. 26, 1983

[30] Foreign Application Priority Data

Jan. 30, 1982 [JP] Japan .................... 57-13979
Dec. 3, 1982 [JP] Japan .................... 57-212188

[51] Int. Cl.³ .................... F02M 3/00; H02P 9/04
[52] U.S. Cl. .................... 290/40 A; 123/339
[58] Field of Search .................... 290/40 A, 40 C; 123/319, 324, 339

[56] References Cited

U.S. PATENT DOCUMENTS 4,015,187 3/1977 Sasaki et al. .................... 290/40 C
4,138,975 2/1979 Hamelin et al. .................... 123/339
4,300,501 11/1981 Suzuki .................... 123/339

FOREIGN PATENT DOCUMENTS 107747 8/1981 Japan .
191428 11/1982 Japan .................... 123/339
1282880 7/1972 United Kingdom .

Primary Examiner—S. J. Witkowski
Assistant Examiner—Shelley Wade
Attorney, Agent, or Firm—Robert E. Burns; Emmanuel J. Lobato; Bruce L. Adams

[57] ABSTRACT

Stabilization of the engine speed is effected rapidly particularly during idle running because there is provided a generator control means capable of suppressing or stopping power generation of a generator driven by an engine in the event the engine speed decreases below a predetermined value. Additionally, according to the present invention it is also possible to provide means capable of adjusting the amount of intake air fed to the engine combustion chamber, whereby in the event of decrease of the engine speed, for example, during idle running it is made possible to stabilize the engine speed rapidly and surely through control of generated energy for a short time and control of the amount of intake air for a long time. Furthermore, the present invention is applicable also to an operating cylinder number control type engine capable of bringing part of cylinders into a non-operative state.

28 Claims, 19 Drawing Figures

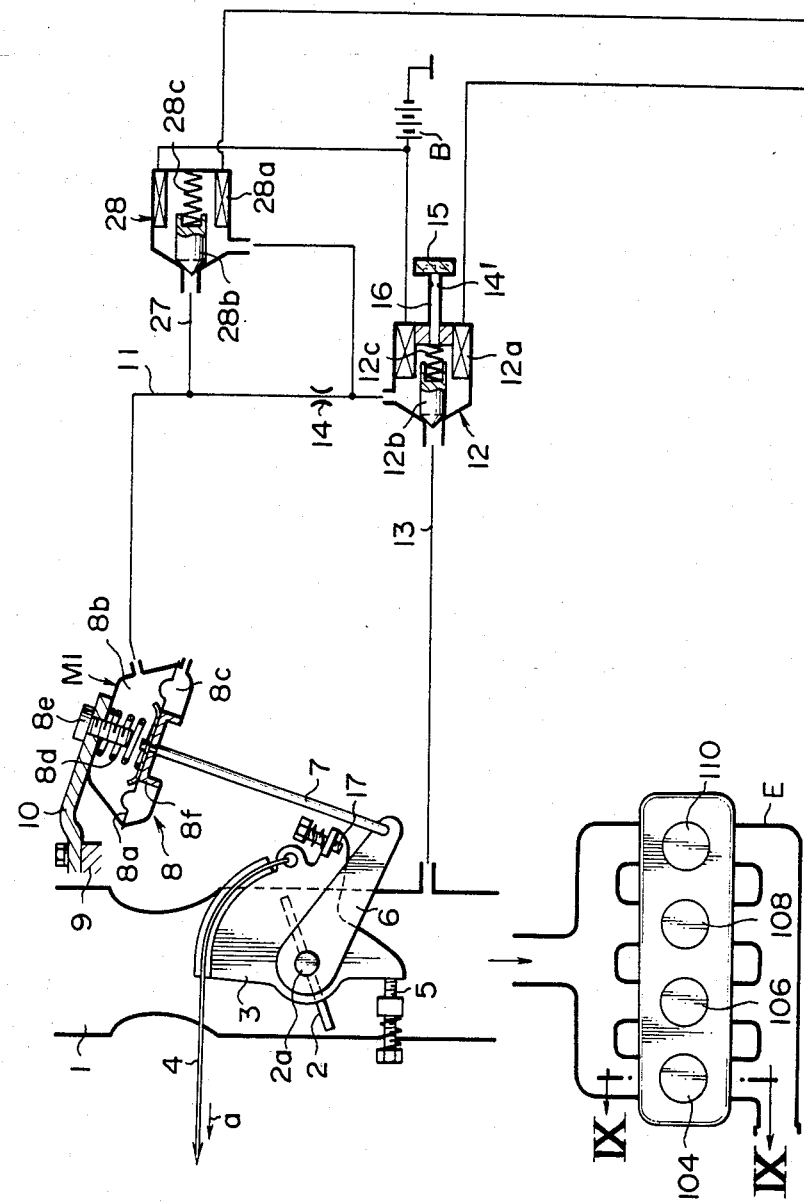

ENGINE SPEED REGULATING SYSTEM

BACKGROUND OF THE INVENTION

1. Field of the Invention

The present invention relates to a system capable of regulating the engine speed.

2. Description of the Prior Art

Heretofore, in order to prevent decrease of the engine speed caused by imposition of an engine load such as an electric load or the like during idle running of an engine, there has been adopted a method wherein a decrease of the engine speed is compensated by feedback control of the engine speed during idling, or a method wherein a decrease of the engine speed is compensated by increasing the throttle valve opening by a predetermined amount interlockedly with on-off of an electric load or the like to enhance idling.

However, in the former method, it is necessary to ensure stability of the feedback control and this requirement causes a limit in point of response characteristic; besides, in the case of an engine which undergoes a great decrease in its speed under load, a decrease of the engine speed and an increase of vibration during a response delay period cause serious problems.

In the latter method, although the response characteristic is good, since variations in the throttle valve opening are fixed values, there occurs the case where the amount of change in opening is too large or too small for an electric load or the like imposed, thus making it difficult to obtain an optimum engine speed matching the imposed load.

SUMMARY OF THE INVENTION

The present invention intends to overcome the above-mentioned problems, and it is the object thereof to provide an engine speed regulating system superior in response characteristic and capable of regulating the engine speed (revolution speed) to an optimum value matching an imposed load by adjusting the load on a generator driven by an engine.

To this end, the engine speed regulating system of the present invention is characterized by comprising a generator driven by an engine for charging a battery, a speed detecting means for detecting the speed of the engine (revolution speed), and a generator control means which produces a control signal for controlling the power generation of the generator associated with the engine on the basis of a signal detected by the engine speed detecting means when the engine speed decreases below a preset value.

Moreover, the engine speed regulating system of the present invention is characterized by comprising a generator driven by an engine for charging a battery, a speed detecting means for detecting the speed of the engine, a generator control means which produced a control signal for controlling the power generation of the generator associated with the engine on the basis of a signal provided from the engine speed detecting means when the engine speed decreases below a first preset value, and intake air flow adjusting means mounted in an intake passage of the engine for adjusting the amount of intake air fed to a combustion chamber of the engine, and an intake air flow control means which causes the intake air flow adjusting means to operate so as to increase the amount of intake air when the engine speed become lower than a second preset value and decrease the amount of intake air when the engine speed becomes higher than the second preset value on the basis of a signal provided from the engine speed detecting means, in which the regulation of the engine speed is effected by cooperation of the generator control means and the intake air flow control means.

Furthermore, the engine speed regulating system of the present invention is characterized by comprising a generator driven by an engine for charging a battery, a speed detecting means for detecting the speed of the engine, a generator control means which produces a control signal for controlling the power generation of the engine on the basis of a signal provided from the engine speed detecting means when the engine speed becomes lower than a first preset value below an idling speed, an intake air flow adjusting means mounted in an intake passage of the engine for adjusting the amount of intake air fed to a combustion chamber of the engine, and an intake air flow control means which causes the intake air flow adjusting means to operate so as to increase the amount of intake air when the engine speed becomes lower than a second preset value below the idling speed on the basis of a signal provided from the engine speed detecting means, in which the regulation of the engine speed during idle running of the engine is effected by cooperation of the generator control means and the intake air flow control means.

Consequently, accordingly to the engine speed regulating system of the present invention, the following effects or advantages are obtained.

(1) In the event the engine speed decreases due to occurrence of an engine load based on operation of an attachment such as a cooler compressor or an oil pump for power steering, not to mention an engine load based on a generator load, or due to occurrence of a variation in output torque of the engine, it is possible to increase the engine speed rapidly by controlling the generated energy of the generator, whereby stabilization of the engine speed particularly during idle running can be attained rapidly.

(2) Decrease of the engine speed caused by an increase of the generator load or the like can be prevented by cooperation of control of the generated energy and control of the throttle valve or control of the amount of intake air through control of the by-pass valve opening, whereby a stable engine operation can be ensured.

(3) Applicable also to a cylinder number control type engine. Particularly, it is possible to attain stabilization of an idling speed during operation of part of cylinders under which the idling speed is apt to become unstable.

DESCRIPTION OF THE PREFERRED EMBODIMENTS

Embodiments of the present invention will be described hereinunder with reference to the accompanying drawings.

Referring first to FIGS. 1 through 6, there is shown an engine speed regulating system according to a first embodiment of the invention.

Figure 1:
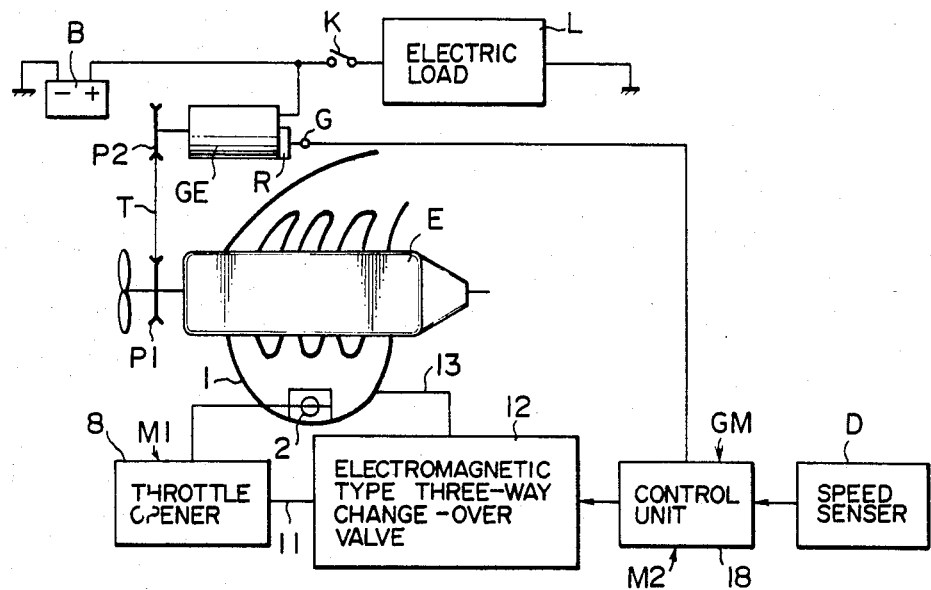
FIG. 1 is an entire block diagram showing a first embodiment of the present invention.

As shown in FIG. 1, a generator GE is connected through pulleys P1, P2 and a belt T to an engine E (e.g. a 1400 cc. series 4-cylinder engine) mounted on a vehicle (not shown), with an output terminal of the generator GE being connected to a battery B rated at 12 V. To the battery B is connected an electric load L such as a headlamp through a key switch K.

A regulator R is mounted within the generator GE, and it is provided with a transistor for controlling the supply of an electric current to a field coil of the generator GE, a Zener diode for regulating the base voltage of the said transistor, a resistor for regulating a divided voltage of the generated voltage of the generator GE acting on the Zener diode or the voltage of the battery B, and a G terminal for regulating the above divided voltage value by changing the resistance value of the said resistor. The regulator R is constructed so that when its G terminal is connected to ground, the regulator R changes the voltage generated by the generator GE from the ordinary 14 volts or so to 10 volts, and if the voltage of the battery B is above 10 volts, the regulator R cuts off the field current of the generator to stop power generation, while when its G terminal is disconnected from ground or connected to the power source, the regulator R brings the generated voltage of the generator GE up to the ordinary 14 volts or so and allows the generator GE to charge the battery B. Such a regulator R is known.

Furthermore, a speed senser D for detecting the engine speed is provided, which may be an ignition coil or the like capable of detecting an ignition signal $S_{IG}$. The speed senser D has an output terminal connected to a generator control means GM. The generator control means GM produces a control signal for suppressing or stopping the power generation of the generator GE on the basis of an output of the speed senser D when the engine speed becomes somewhat smaller than a desired idling speed.

Figure 2:
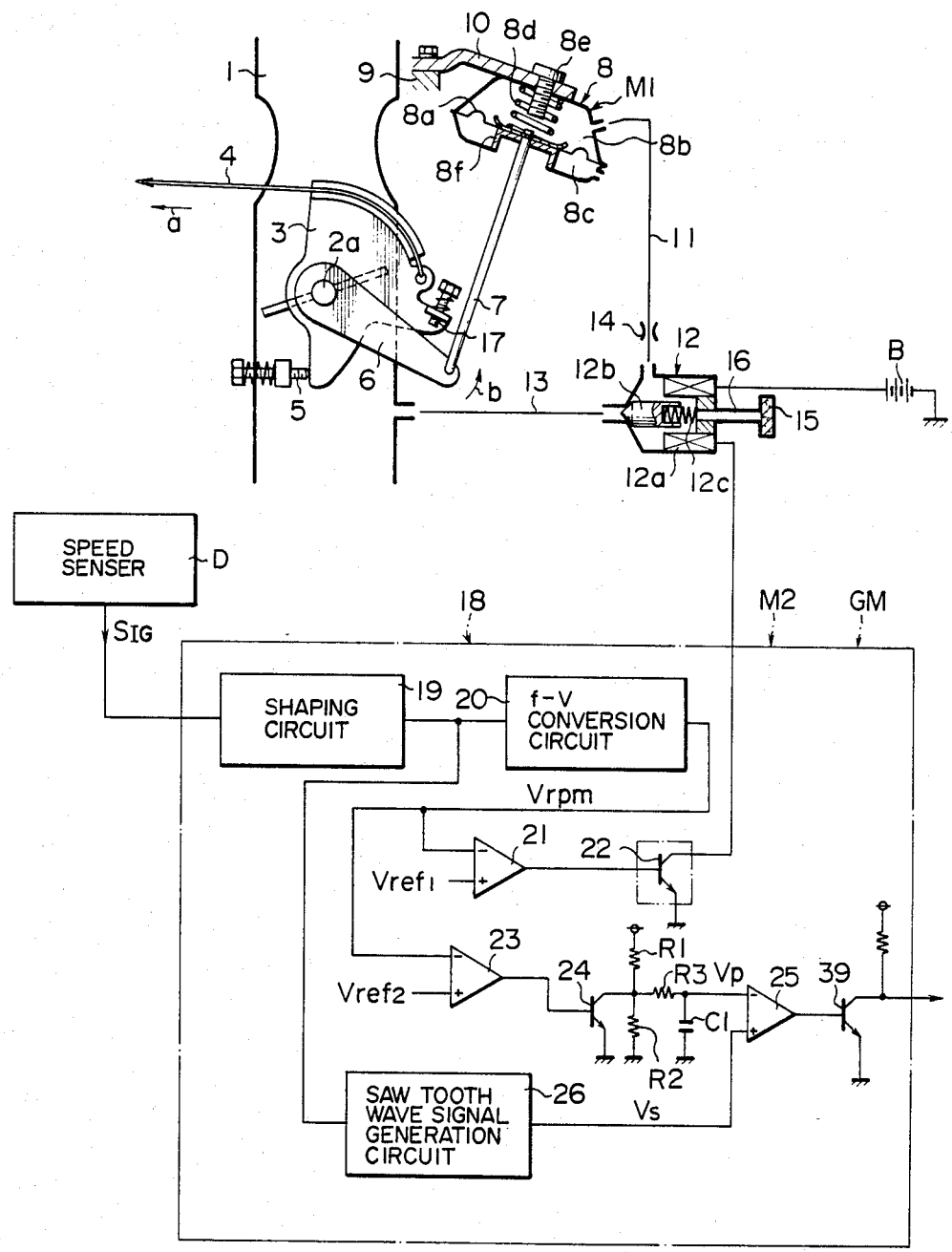
FIG. 2 illustrates schematically and typically the structure of a principal portion of the first embodiment.

As shown in FIGS. 1 and 2, in an intake passage 1 of the engine E is mounted a throttle valve 2 at a downstream side of the carburetter Venturi portion. Moreover, there is provided a throttle valve opening switching means M1 capable of switching the throttle valve 2 between a first opening position (the throttle valve position shown in FIG. 2) and a larger second opening position during idle running, and there also is provided a throttle valve opening control means M2 as a control portion of an intake air flow control means, the throttle valve opening control means M2 being capable of providing a control signal to the throttle valve opening switching means M1 so that the throttle valve 2 closes to the first opening position when the engine speed is higher than a second preset value N2 (e.g. 740 rpm) which is a desired idling speed, and opens to the second opening position when the engine speed is lower than the second preset value N2.

Assuming that the engine E is operated in a standard idling state as will be explained below when throttle valve 2 is in its first opening position, the engine E is adapted to rotate at a third preset value N3 (e.g. 750 rpm) which is a little higher than the second preset value N2. That is, the opening of the throttle valve 2 in its first opening position is set at a value at which the engine E does not stall in the standard idling state mentioned above. Under an electric load L such as headlamps, the generator GE backs up the battery B and starts charging it, whereby the generator load is imposed on the engine E. An idling state in the absence of such a generator load or an auxiliary machine driving load such as a cooler compressor or an oil pump for power steering is referred to herein as the standard idling state.

The throttle valve opening switching means M1, the throttle valve opening control means M2 and the generator control means GM will now be described concretely. The throttle valve 2 has a shaft 2a, on which is mounted a first lever 3 capable of rotating integrally with the shaft 2a. To the first lever 3 is connected a wire 4 which is pulled in the direction of arrow "a" when an accelerator pedal (not shown) is depressed. More particularly, depression of the accelerator pedal causes the wire 4 to be pulled, so that the first lever 3 moves pivotally in a counterclockwise direction in FIG. 2, thus causing the throttle valve 2 to move in its opening direction. When the depression of the accelerator pedal is stopped, the throttle valve 2 pivotally moves clockwise in FIG. 2 in its closing direction by virtue of the biasing force of a return spring (not shown).

The pivotal clockwise movement in FIG. 2 of the first lever 3 is restricted by a first speed adjusting screw (hereinafter referred to as the "first screw") which serves as a first stopper fixed to the throttle body. Thus, when the first lever 3 abuts the first screw 5 during idle running, the throttle valve 2 can assume its first opening position.

Furthermore, a second lever 6 is loosely fitted on the shaft 2a and it is driven by a throttle opener 8 as a differential pressure responsive mechanism connected to the lever 6 through a rod 7 which is pivotally secured to the tip end of the lever. The throttle opener 8 is attached to an engine side fixed portion 9 through an arm 10, and it is provided with chambers 8b and 8c which are partioned from each other by a diaphragm 8a, with the rod 7 being connected to the diaphragm 8a. Within the chamber 8b is mounted a compression spring 8d. Further, one end of a passage 11 with an anti-hunting constriction 14 is connected to the chamber 8b, and to the other end thereof is connected an electromagnetic type three-way change-over valve (solenoid valve) 12. To the change-over valve 12 are connected both a passage 13 communicating with the intake passage 1 in a downstream position with respect to the throttle valve 2 for conducting a negative intake manifold pressure and an atmospheric pressure conducting passage 16 communicating with the atmosphere through an air filter 15. A plunger 12b is operated by an on-off action of a solenoid coil 12a of the three-way change-over valve 12 or by the action of a return spring 12c, whereby it is made possible to exert a negative intake manifold pressure or atmospheric pressure gradually upon the chamber 8b through the pasage 11 with a constriction 14. The interior of the chamber 8c is held at atmospheric pressure.

Moreover, stoppers 8e and 8f are mounted in the chambers 8b and 8c, respectively, for restricting the movement of the rod 7 through the diaphragm 8a.

Furthermore, a second speed adjusting screw (hereinafter referred to as the "second screw") 17 serving as a second stopper is attached to the lever 3. The second lever 6, when turned in a counterclockwise direction in FIG. 2, abuts the second screw 17 and can move the first lever 3 and throttle valve 2 pivotally through the second screw 17.

Accordingly, when the negative intake manifold pressure during idle running is exerted on the interior of the chamber 8b of the throttle opener 8, the rod 7 is drawn up, so that the second lever 6 turns counterclockwise as indicated with arrow "b" in FIG. 1 and causes the first lever 3 to turn also in the counterclockwise direction in FIG. 2, thus resulting in that the opening of the throttle valve 2 becomes larger than that in the first opening position. That is, during idle running, the throttle valve 2 can take a second opening position in which its opening is larger than that in the first opening position. At this time, the first lever 3 is spaced away from the first screw 5.

On the other hand, when atmospheric pressure is exerted on the interior of the chamber 8b of the throttle opener 8, the rod 7 is forced down, so that the second lever 6 leaves the second screw 17 and the first lever 3 is brought into abutment with the first screw 5 by a return spring (not shown), thereby permitting the throttle valve 2 to take its first opening position during idling.

Thus, by changing the internal pressure of the chamber 8b of the throttle opener 8, it is possible to switch the position of the throttle valve 2 between the first and the second opening position.

The solenoid coil 12a of the three-way change-over valve 12 is connected to a control output side of a control unit 18. The control unit 18 includes a shaping circuit 19 which receives the ignition signal $S_{IG}$ as a speed signal from the speed senser D, and a frequency-voltage conversion (hereinafer referred to as "f-V conversion") circuit 20 which performs f-V conversion for a pulse train signal synchronized with the engine speed provided from the shaping circuit 19. It further includes a comparator 21 which compares an analog voltage signal $V_{rpm}$ provided from the f-V conversion circuit 20 with a reference signal $V_{ref1}$ corresponding to the second preset speed N2, and if $V_{rpm} < V_{ref1}$, outputs a high level signal, and if $V_{rpm} > V_{ref1}$, outputs a low-level signal, and a transistor 22 adapted to turn on or off according to the pulse train signal obtained in the comparator 21.

When the engine speed is higher than the second present value N2 as in the standard idling state, a low level signal is provided from the comparator 21 because $V_{rpm} > V_{ref1}$, so that the transistor 22 is turned off and the solenoid coil 21a of the three-way change-over valve 12 is de-energized, whereby atmospheric pressure is exerted on the interior of the chamber 8b of the throttle opener 8, thus causing the first lever 3 to abut the first screw 5 as previously noted, and the throttle valve 2 occupies its first opening position. As a result, the engine E can rotate at the third preset speed N3 (e.g. 750 rpm).

On the other hand, when the engine speed is lower than the second preset value N2, the output side of the comparator 21 becomes high level because $V_{rpm} < V_{ref1}$, so that the transistor 22 is turned on and the solenoid coil 12a of the three-way change-over valve 12 is energized, whereby the negative intake manifold pressure is exerted on the interior of the chamber 8b of the throttle opener 8, thus causing the second lever 6 to abut the second screw 17 and turn the first lever 3 counterclockwise through the second screw 17 as indicated with arrow "b" in FIG. 2 in the manner previously described, and the throttle valve 2 occupies its second opening position. As a result, the engine E can rotate at approximately the second preset speed N2.

The control unit 18 further includes a comparator 23 which compares the signal $V_{rpm}$ with a reference signal $V_{ref2}$ corresponding to a preset comparative speed NS (e.g. 720, rpm), and if $V_{rpm} < V_{ref2}$, outputs a high level signal, and if $V_{rpm} > V_{ref2}$, outputs a low level signal, and a transistor 24 adapted to turn on or off according to a pulse train signal obtained in the comparator 23.

The transistor 24 is constituted as a switching transistor for controlling the charge and discharge of a circuit which comprises a capacitor C1 and resistors R1, R2, R3. When the transistor 24 is on, the capacitor C1 is discharged, and when the transistor 24 is off, the capacitor C1 is charged, thereby permitting regulation and control of the magnitude of an inter-terminal voltage $V_p$ of the capacitor C1.

Figure 3A:
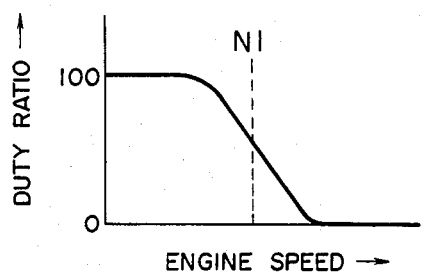
FIGS. 3(a) (b), 4 and 5(a) (b) are graphs for explaining the operation of the first embodiment.
Figure 3B:
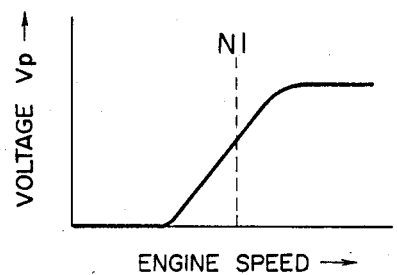

Since a ripple synchronized with the ignition signal is lapped over the signal $V_{rpm}$, the on time/(on time+off time) characteristic of the transistor 24 is as shown in FIG. 3(a), and the potential $V_p$ of the capacitor C1 in a steady state is as shown in FIG. 3(b).

Figure 4:
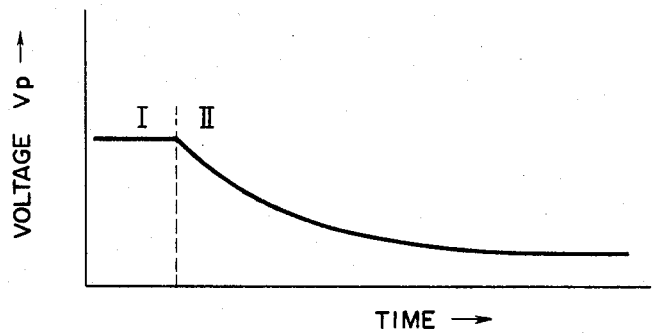

When the engine speed changes stepwise, there is obtained such a response curve of $V_p$ as shown in FIG. 4, in which the area indicated at I shows a high speed side and the area indicated at II shows a lower speed side.

The voltage $V_p$ is fed to one input terminal of a comparator 25.

Figure 5A:
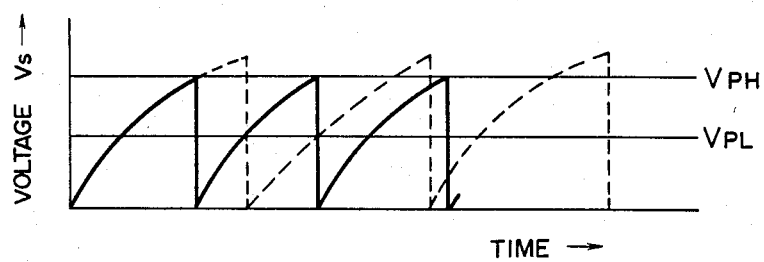

The control unit 18 further includes a saw tooth wave signal generation circuit 26 which receives an output signal from the shaping circuit 19 and produces such a false saw tooth wave signal Vs as shown in FIG. 5(a) in synchronism with the ignition signal $S_{IG}$, the signal Vs from the saw tooth wave signal generation circuit 26 being fed to the other input terminal of the comparator 25.

The comparator 25 provides a high level signal when $V_p < V_s$ and a low level signal when $V_p > V_s$, with its output side being connected to the base of a transistor 39. The transistor 39 is turned on or off with high or low level signal provided from the comparator 25.

$V_s$ is adapted to decrease in frequency and increase in its maximum voltage (peak value) with decrease of the engine speed, while $V_p$ is adapted to increase in a steady state as the engine speed increases. Consequently, in a steady state, when the engine speed is higher than the first preset value N1 (e.g. 735 rpm) a little lower than the second preset value N2, $V_p$ is kept larger than $V_s$ and the comparator 25 produces low level signals continuously, while when the engine speed becomes lower than the first preset value N1 (N1>NS), the maximum voltage of $V_s$ becomes higher than $V_p$ and the comparator 25 outputs high level signals intermittently, and when the engine speed decreases below a preset value N0 smaller than the comparative preset speed NS, $V_p$ is kept equal to or smaller than $V_s$ and the comparator 25 outputs high level signals continuously or nearly continuously. When the engine speed is between the above N1 and N0, the comparator 25 outputs high level signals for a longer time as the engine speed decreases.

The transistor 39 is constructed as a switching transistor so that when it is turned on, the G terminal of the regulator R is connected to ground, while when it is turned off, the said G terminal is disconnected from ground. Usually, therefore, when the transistor 39 is on, the generator GE stops power generation, so the load thereon becomes light, while when the transistor 39 is off, the generator GE performs power generation and the generator load is imposed on the engine E.

The first to third preset speeds N1-N3 are set at such a relation of magnitude as $N3>N2 \geqq N1$, and particularly the regulation to $N2 \geqq N1$ is sure to be effected within the same control unit 18.

In the hereinabove described construction, if the electric load L is turned on, for example, by lighting of headlamps, when the engine E is in the standard idling state, that is, when it is rotating at the third preset speed N3, the generator GE starts power generation to back up the battery B and the generator load is imposed on the engine E, thus resulting in decrease of the engine speed. And when the engine speed decreases below the first preset value N1, the period of signal provided from the saw tooth wave signal generation circuit 26 becomes longer, so that the waveform of the signal changes from the state shown in solid line to the state shown in dotted line in FIG. 5(a), and at the same time the comparator 23 detects the decrease of the engine speed and allows the capacitor C1 to discharge through the transistor 24, thus causing the voltage $V_p$ to drop and change from $V_{PH}$ to $V_{PL}$.

Figure 5B:
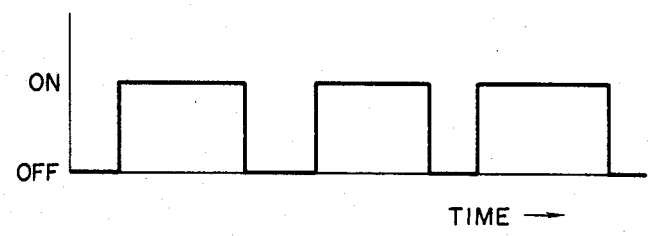

Consequently, the time for $V_p<V_s$ becomes longer and the ON time of the transistor 39 becomes longer as shown in FIG. 5(b), so that the time rate of the G terminal of the regulator R being grounded by the transistor 39 becomes larger and the power generating capability of the generator GE is deteriorated. As a result, the load on the engine E is reduced and the decrease of the engine speed stops, and after several seconds, the voltages $V_p$ and $V_s$ assume a steady state, the grounding ratio of the G terminal becomes a steady state and the engine E is now capable of continuing a stable operation at a speed lower than that at its original idling state, namely, in the vicinity of the comparative preset speed NS (e.g. 720 rpm). In this case, the grounding ratio of the G terminal is about 50%.

Such a state is reached in about several seconds from the time when the electric load L was applied. The throttle opener 8 as will be described below begins to operate simultaneously with decrease of the engine speed, but at this time the throttle valve opening changes little because the response characteristic of the throttle opener is not so good. In this state, moreover, the power consumed by the electric load is not fully supplied by the generated energy of the generator GE, relying on the discharge of the battery B.

In this state, the three-way change-over valve 12 is operated with a signal provided from the control unit 18 and the throttle opener 8 operates gradually to increase the throttle valve opening by degrees, but at the initial stage thereof an increase in rotation caused by increase of the throttle valve opening induces a decrease of the grounding time rate of the G terminal of the regulator R and the generator load increases, so that the engine speed is little increased and the engine rotates at a speed in the vicinity of the comparative preset value NS until the generator GE can generate the power consumed by the electric load L.

When the grounding time rate of the G terminal decreases to a state in which the generator GE can generate the consumed power, a further increase of power generation is suppressed by the function of the regulator R even if the grounding time rate further decreases, so that the generator load no longer increases and the engine speed increases with changes of the throttle valve opening toward the second preset value N2.

The above operation will now be described on the basis of the operation of the throttle opener 8. Upon application of the electric load L, the control unit 18 provides an energizing signal to the solenoid coil 12a to let the three-way change-over valve 12 conduct to the negative pressure side, so that a negative intake manifold pressure (a negative pressure control signal) is gradually applied to the chamber 8b of the throttle opener 8 through the constriction 14, whereby the second lever 6 is brought into abutment with the second screw 17 and the lever 3 is turned slowly to the throttle valve opening side through the second screw. As a result, the amount of intake air fed to the combustion chamber is increased and the engine speed gradually increases, and when the engine speed exceeds the second preset value N2, the control unit 18 again issues a de-energizing signal to the solenoid coil 12a to let the three-way change-over valve 12 conduct to the atmosphere side, so that the negative intake manifold pressure (negative pressure control signal) is released gradually from the chamber 8b of the throttle opener 8 through the constriction 14, whereby the throttle valve 2 is turned gradually to the closing side to decrease the amount of intake air fed to the combustion chamber and consequently the engine speed decreases gradually.

However, when the engine speed becomes lower than the second preset value N2, the three-way change-over valve 12 again switches to the negative pressure side, so the engine speed again increases gradually. This cycle of operation is repeated whereby the engine speed is held at approximately the second preset value N2 while varying in the vicinity of this value N2.

In order to ensure the above operation, the preset speeds are set so as to be $N3>N2 \geqq N1$ as noted above. As a result, the engine speed can be regulated in proportion to the engine load by control of the generated energy for a short time and by control of the throttle valve opening for a long time.

Then, if the load L is again disconnected, the generator load decreases, thus allowing the engine speed to increase beyond the second preset value N2, so that the three-way change-over valve 12 is opened to the atmosphere. As a result, coupled with a gradual action of the atmosphere on the throttle opener 8, the opening of the throttle valve 2 becomes smaller gradually until the first lever 3 finally abuts the first screw 5, and the engine E assumes the standard idling state.

FIGS. 6(a) through 6(e) show in what manner the engine E settles to the second preset speed N2 from the standard idling state through the comparative preset speed NS, with respect to each of generated energy, ON time/(ON time+OFF time) [ON/(ON+OFF)] of the transistor 39, engine speed, throttle opener negative pressure and opening of throttle valve.

According to the first embodiment described above, in the event of decrease of the engine speed during idle running, it is possible to increase and stabilize the engine speed rapidly and surely by control of generated energy for a short time and by control of amount of intake air based on the control of the throttle valve opening for a long time.

Moreover, the above first embodiment is constructed so that with increase of the deviation between the engine speed and the first preset speed N1 when the former decreases below the latter, the comparator 25 outputs high level signals for a longer time, therefore, the greater the decrease of the engine speed, the more generated energy is placed under control, that is, the power generation cut ratio increases, thus permitting a smooth increase of the engine speed. Particularly, when the engine speed decreases blow the preset value N0 smaller than the comparative preset value NS, the comparator 25 outputs high level signals almost continuously, so that the generated energy becomes extremely small or nil, thus permitting an extremely rapid increase of the engine speed.

In the above first embodiment, moreover, the engine speed at which control for the generator is started is actually lower than the first preset speed N1, and this is for the following reason. In the event the engine speed decreases relatively rapidly upon application thereto of a stepped load such as an auxiliary machine driving load, the voltage $V_s$ rapidly increases in its maximum value in response to the decrease of the engine speed, while the voltage $V_p$ decreases in its voltage level relatively slowly against the decrease of the engine speed as shown in FIG. 4. Steadily, therefore, the engine speed at which the maximum value (i.e. the peak of saw tooth wave voltage) exceeds $V_p$ corresponds to the first preset speed N1, but actually the engine speed at which $V_s$ exceeds $V_p$ at the beginning of operation of an auxiliary machine corresponds to a preset speed (e.g. the comparative preset speed NS) lower than the first preset speed N1.

However, no matter whether the control of the generator GE is made at an engine speed lower than the first preset value N1 or at an engine speed lower than the comparative preset value NS, both are equal to each other in that the said control is performed at an engine speed lower than a predetermined idling speed and contributes to the stabilization of the engine speed.

The throttle opener 8 operates to actuate the second lever 6 even in other driving condition than idle running, but even if the second lever 6 should move, it will never strike against the second screw 17 and thus cause no problem because the first lever 3 is turned counter-clockwise in FIG. 2 by the wire 4 during vehicular travelling.

Moreover, even in the event the accelerator pedal is returned suddenly and the throttle valve 2 closes, it is not likely at all that the engine E will stall, because the throttle valve 2 is held in its first opening position defined by the screw 5.

Furthermore, in case the second preset speed N2 is higher than the third preset speed N3, the engine E performs idling always at either the comparative preset speed NS or the second preset speed N2, but even in this case the existence of the first screw 5 is still effective as long as the third preset speed N3 is not low to the extreme degree.

Although in the above first embodiment there was used the throttle valve 2 as an intake air flow adjusting valve which constitutes intake air flow adjusting means, this intake air flow adjusting valve may be constituted by a by-pass valve mounted in the intake passage by-passing the throttle valve 2.

Figure 6:
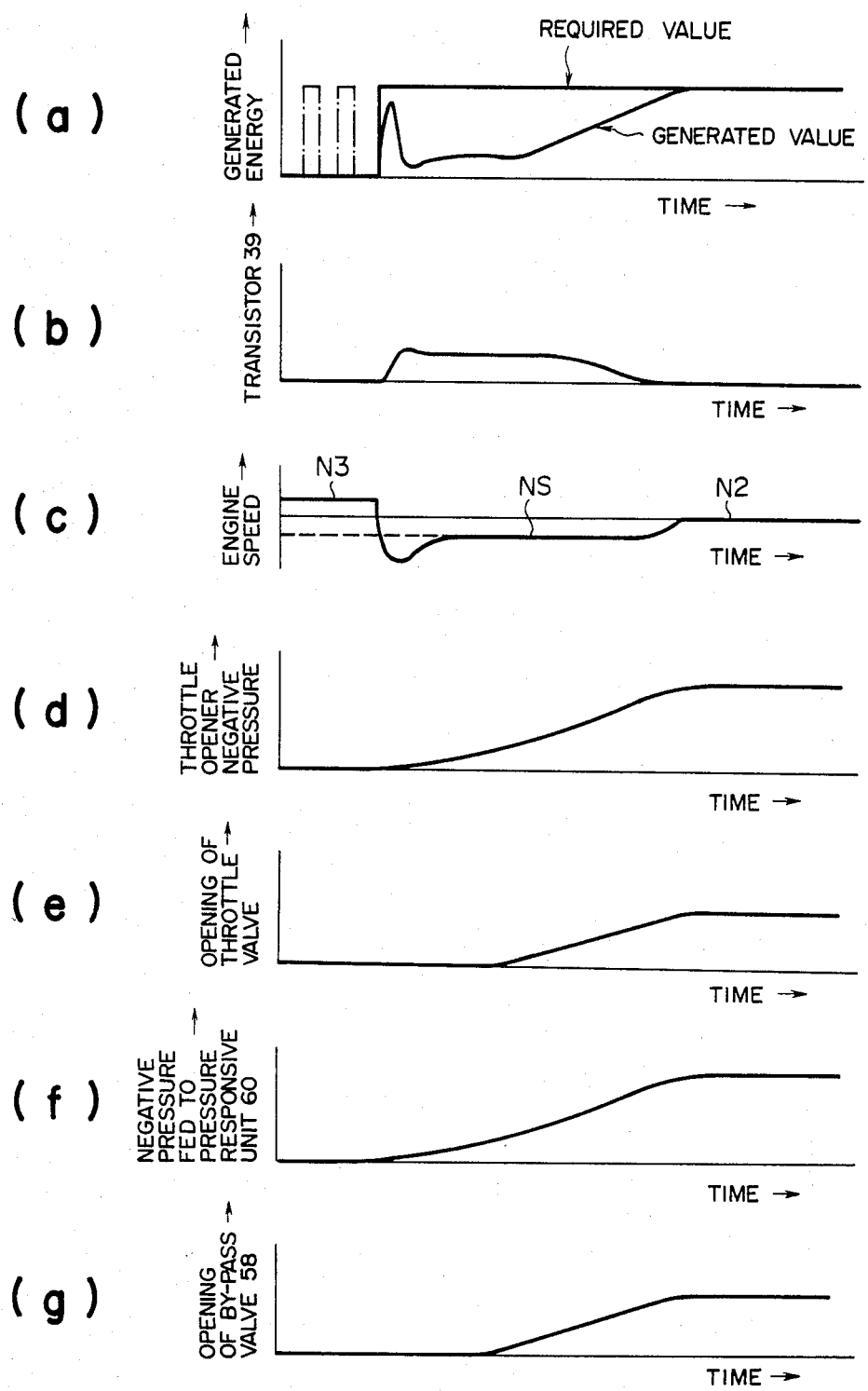
FIGS. 6(a) (b) (c) are graphs for explaining the operation of the first embodiment and a second embodiment of the present invention.
FIGS. 6(d) (e) are graphs for explaining the operation of the first embodiment.
FIGS. 6(f) (g) are graphs for explaining the operation of the second embodiment.

A second embodiment of the present invention will be described hereinunder with reference to FIGS. 6 and 7 in which the intake air flow adjusting valve is constituted by a throttle by-pass valve and in which the same or substantially the same members as those explained in the above first embodiment will be indicated at the same reference numerals or marks as those in the first embodiment and detailed explanation thereon will be omitted.

Figure 7:
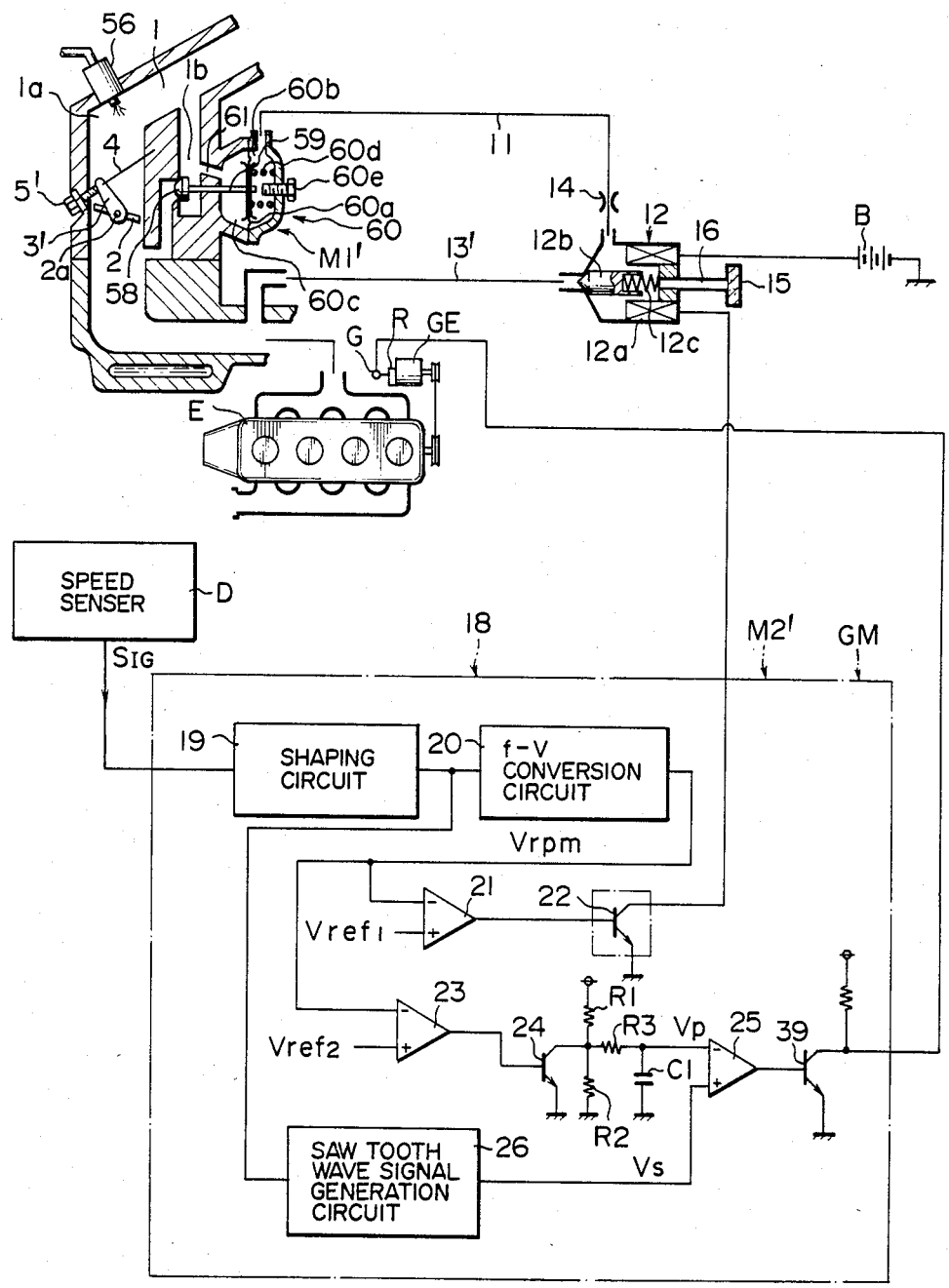
FIG. 7 illustrates schematically and typically the structure of the second embodiment.

In FIG. 7, the engine E is provided with a low pressure, fuel injection device as a fuel supply unit in place of the carburetter. In an intake passage 1 is mounted a throttle valve 2 through a shaft 2a, on which is mounted a lever 3' integrally rotatably. To the lever 3' is fixed a wire 4 which is connected to an accelerator pedal (not shown) so that when the accelerator pedal is depressed by the driver, the wire 4 causes the throttle valve 2 to move in an opening direction through the lever 3'. While the accelerator pedal is not depressed, the throttle valve 2 is urged in a closing direction by a return spring (not shown) and held in a position (minimum opening position of the throttle valve 2) where the lever 3' abuts an adjust screw 5'. By the adjust screw 5' is ensured a minimum amount of intake air fed to each combustion chamber in a fully closed state of a by-pass valve 58 as will be described later, and by this minimum amount of intake air is regulated the adjust screw 5' so that the engine speed becomes the third preset speed N3 (e.g. 750 rpm) in the standard idling state.

Further, in the intake passage is mounted a fuel injection valve 56 at an upstream side with respect to the throttle valve 2. The upstream end of the intake passage communicates with the atmosphere through an intake flow meter and an air cleaner (neither shown). The amount of fuel to be ejected from the fuel injection valve 56 is decided on the basis of an intake air flow signal detected by the said intake air flow meter or other driving state signal (e.g. engine speed, throttle valve opening, cooling water temperature, or intake air temperature). Further mounted in the intake passage 1 is a by-pass intake passage portion 1b which by-passes a main intake passage portion 1a where there are mounted the throttle valve 2 and the fuel injection valve 56 and which provides communication between up- and downstream of the main intake passage portion 1a. In the by-pass intake passage portion 1b is mounted the by-pass valve 58. Thus, the intake air passing through the throttle valve 2 and that passing through the by-pass valve 58 are fed to each combustion chamber of the engine E. The by-pass valve 58 is connected through a connecting member 59 to a diaphragm 60a of a pressure responsive unit 60 which constitutes a by-pass valve opening switching means M1'. In the pressure responsive unit 60 are formed chambers 60b and 60c which are partitioned from each other by the diaphragm 60a. The chamber 60c communicates through a communication path 61 with the by-pass intake passage portion 1b at an upstream side with respect to the by-pass valve 58 and serves as an atmospheric chamber. On the other hand, the chamber 60b is connected to a three-way change-over valve 12 through a passage 11. To the three-way change-over valve 12 are connected both a passage 13' communicating with the intake passage at a downstream side with respect to the junction between the downstream end of the main intake passage portion 1a and that of the by-pass intake passage portion 1b for conducting a negative intake manifold pressure, and a passage 16 communicating with the atmosphere through an air filter 15 for introducing atmospheric pressure. A plunger 12b is operated by on-off action of a solenoid coil 12a of the three-way change-over valve 12 and the action of a return spring 12c, whereby it is made possible to exert the negative intake manifold pressure or atmospheric pressure gradually upon the chamber 60b through the passage 11 formed with a constriction 14.

In the chamber 60b are mounted a spring 60d for urging the by-pass valve 58 in the closing direction through the diaphragm 60a, and an adjust screw 60e for setting the maximum opening position as a second opening position of the by-pass valve 58. When negative pressure is not exerted on the chamber 60b, the by-pass valve 58 is held in the minimum opening position (a fully closed position in this case) as a first opening position by the urging force of the spring 60d, while upon application of negative pressure to the chamber 60b, the by-pass valve 58 changes in position toward its maximum opening position.

The construction of the three-way change-over valve 12 is the same as that described in the foregoing first embodiment, in which its solenoid coil 12a is connected to the control output side of a control unit 18 which constitutes a by-pass valve opening control means M2' as a control section. The control unit 18 is of the same construction as that described in the first embodiment.

In the construction described above, when the engine E is in the standard idling state, the by-pass valve 58 is located in its minimum opening position and the engine rotates at the third preset speed N3. In this state, if the electric load L is turned on, for example, by lighting of headlamps, the generator GE generates power continuously, thus imposing the generator load on the engine E to decrease the engine speed.

When the engine speed becomes lower than the first preset value N1, the power generating capability of the generator GE is deteriorated samely as the first embodiment, so that the load on the engine E is diminished to stop decrease of the engine speed, and after several seconds, the engine speed is stabilized in the vicinity of the comparative preset value NS.

Such a state is reached in about several seconds from the time when the electric load was applied, but because the response characteristic of the pressure responsive unit 60 is relatively not good, the by-pass valve opening changes little although the passage 13' side of the three-way change-over valve 12 is opened with a signal provided from the control unit 18.

Then, from this state, the pressure responsive unit 60 operates gradually in response to the signal from the control unit 18 and the opening of the by-pass valve 58 increases little by little, but at its initial stage the grounding time rate of G terminal of the regulator R is decreased due to increase of rotation based on increase in the amount of intake air caused by increase of the by-pass valve opening, so that the generator load increases and therefore the engine speed scarcely increases. For this reason, the engine speed is maintained at a value near the comparative preset value NS until the generator GE can generate the power consumed by the electric load L.

And when the grounding time rate of the G terminal decreases to the extent that the generator GE can generate the consumed power, the generator load no longer increases even with a further decrease of the grounding time rate because a further increase of power generation is suppressed by the function of the regulator R, and the engine speed increases toward the second preset value N2 with changes of the by-pass valve opening.

The above operation will now be described on the basis of the operation of the pressure responsive unit 60. Upon application of the electric load L, the control unit 18 provides an energizing signal to the solenoid coil 12a to let the three-way change-over valve 12 to conduct to the negative pressure side, so that a negative intake manifold pressure (a negative pressure control signal) is gradually applied through the constriction 14 to the chamber 60b of the pressure responsive unit 60, thereby allowing the diaphragm 60a to move the by-pass valve 58 gradually to the opening side through the connecting member 59. As a result, the amount of intake air increases to increase the engine speed gradually, and when the engine speed exceeds the second preset value N2, the control unit 18 provides a de-energizing signal again to the solenoid coil 12a to let the three-way change-over valve 12 conduct to the atmosphere side, so that the negative intake manifold pressure (negative pressure control signal) is gradually released from the chamber 60b of the pressure responsive unit 60 through the constriction 14, whereby the by-pass valve 58 is moved gradually to the closing side to decrease the amount of intake air to thereby decrease the engine speed by degrees.

However, when the engine speed becomes lower than the second preset value N2, the three-way change over valve 12 again switches to the negative pressure side, thus allowing the engine speed to increase again gradually. By repetition of this operation the engine speed is held at approximately the second preset value N2 while varying in the vicinity of the value N2. As a result, the engine speed can be regulated according to engine loads by control of generated energy for a short time and by control of the by-pass valve opening for a long time.

Thereafter, if the electric load L is disconnected, the generator load decreases, thereby allowing the engine speed to increase beyond the second preset value N2, and so the three-way change-over valve 12 is opened to the atmosphere. As a result, coupled with a gradual exertion of the atmosphere upon the pressure responsive unit 60, the opening of the by-pass valve 58 decreases gradually until the valve 58 is finally located in its minimum opening position, and the engine E assumes the standard idling state.

FIGS. 6(a) through (c), (f) and (g) show in what manner the engine E settles to the second present speed N2 from the standard idling state through the comparative preset speed NS, with respect to each of generated energy, ON time/(ON time+OFF time)[ON/(ON+-OFF)] of transistor 39, engine speed, negative pressure fed to the chamber 60b of the pressure responsive unit 60 and opening of the by-pass valve 58.

According to the second embodiment described above, like the foregoing first embodiment, in the event of decrease of the engine speed during idle running, it is possible to increase and stabilize the engine speed rapidly and surely by control of generated energy for a short time and by control of the amount of intake air for a long time.

In the above first and second embodiments there has been described regulation of the engine speed in case of occurrence of an engine load induced by the generator GE. According to the engine speed regulating systems in those embodiments, moreover, also in the event of a sudden decrease of the engine speed caused by operation of an auxiliary machine such as a cooler compressor or an oil pump for power steering, or by occurrence of a change in the engine output torque, during idling, it is possible to rapidly increase the engine speed to thereby prevent stall of the engine and the occurrence of vibration. More particularly, usually while the engine is in operation, as shown in alternate long and short dash line in FIG. 6(a), power generation is performed intermittently for supplying power to normal loads such as an ignition device and a motor-driven fuel pump even if a large electric load such as handlamps is off, and in the event of decrease of the engine speed during idling caused by operation of such auxiliary machinery or by occurrence of a change in the engine output torque, the power generation for those normal loads is suppressed or stopped to diminish the engine load, thereby permitting a rapid increase of the engine speed, and further the stabilization of the engine speed is attained by adjustment of the amount of intake air based on the operation of the intake air flow adjusting valve (throttle valve in the first embodiment and by-pass valve in the second embodiment).

In the foregoing first and second embodiments, in case it is necessary to use the constriction 14 having an extremely large throttle amount, namely, having an extremely small passing sectional area, it is possible to adjust the delay time by combination of a constriction having a suitable throttle amount with an accumulator.

In this case, the ripple created when producing a voltage proportional to the engine speed by f-V conversion of the engine speed signal is not smoothed and the voltage signal from the f-V conversion circuit is compared directly with the reference signal $V_{ref1}$, and therefore the control for bringing the engine speed to the second preset value N2 is performed to attain stabilization at a point of balance without describing a limit cycle.

Furthermore, in place of the three-way change-over valve 12 used in the foregoing first and second embodiments, there may be used in combination an electromagnetic change-over valve for release to the atmosphere and electromagnetic change-over valve for application of a negative pressure. In this case, when the engine speed is higher than the second preset speed N2, the control unit outputs a signal for switching the atmospheric change-over valve to the atmosphere side, while when the engine speed is lower than the second preset speed N2, the control unit outputs a signal for switching the negative pressure applying change-over valve to the negative pressure side.

Figure 8B:
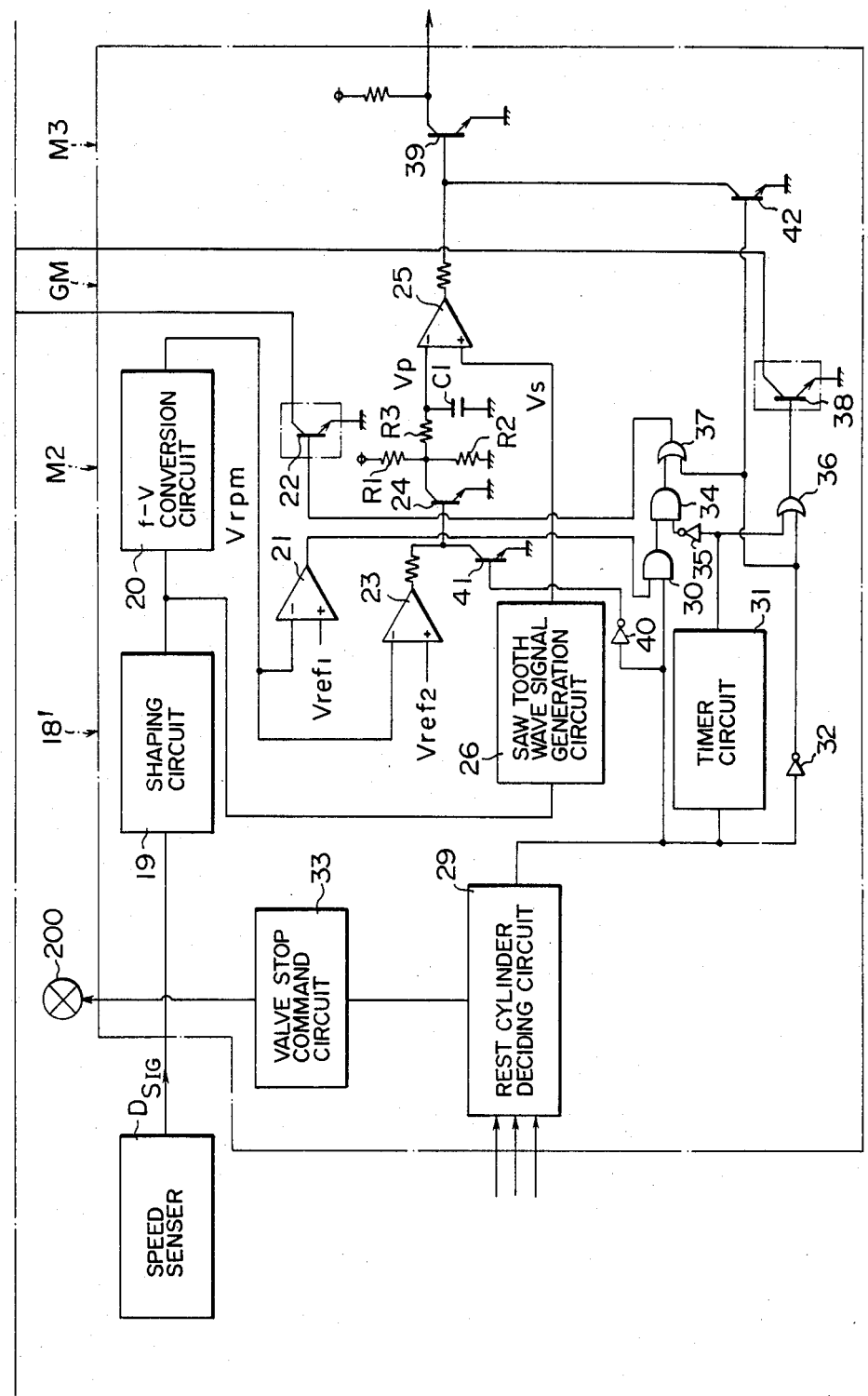
FIGS. 8(a) (b) illustrate schematically and typically the structure of a principal portion of a third embodiment of the present invention.

A third embodiment of the present invention will be described hereinunder with reference to FIGS. 8 and 9. In this third embodiment, like the foregoing first embodiment, the intake air flow adjusting valve is constituted by a throttle valve 2, and the same or substantially the same members as those described in the first embodiment will be indicated at the same reference numerals or marks and their detailed explanations will be omitted.

In this embodiment, the engine E is constituted as a series 4-cylinder type cylinder number controlled engine capable of performing a 4-cylinder operation (all cylinder operation) or a 2-cylinder operation (partial cylinder operation) by control of the number of cylinders to be operated. More particularly, the engine E is provided with two rest cylinders (the outer first and fourth cylinders in the illustrated embodiment) which can be stopped operation and shift into a rest state in some particular operating conditions (e.g. under a low load) by a cylinder number control means, and two working cylinders (the inner second and third cylinders) adapted to operate at all times independently of such operating conditions.

Figure 9:
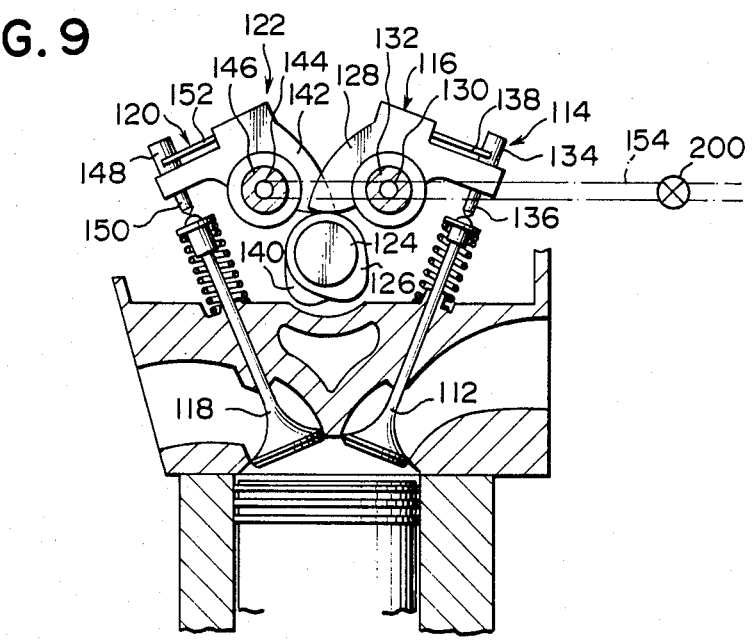
FIG. 9 is a sectional view taken on arrow IX—IX of FIG. 8.

The second and third cylinders of the engine are provided with known intake valve driving device and exhaust valve driving device, while, as shown in FIG. 9, the first and fourth cylinders are provided with an intake valve driving device 116 having a valve stop mechanism 114 as a cylinder stop means for stopping the operation of an intake valve 112, and an exhuast valve driving device 122 having a valve stop mechanism 120 as a cylinder stop means for stopping the operation of an exhaust valve 118.

The intake valve driving device 116 has an intake cam 126 formed on a cam shaft 124, an intake rocker arm 128 adapted to be operated by the intake cam 126, a rocker shaft 132 which pivotally supports the intake rocker arm 128 and which is formed with an oil passage 130, and the valve stop mechanism 114 supported by the intake rocker arm 128.

The valve stop mechanism 114 is provided with a cylinder 134 fixed to the intake rocker arm 128, a plunger 136 disposed slidably within the cylinder 134, a stopper 138 which permits a sliding motion of the plunger 136 within the cylinder 134 when an oil pressure is exerted on the oil passage 130 and which holds the plunger 136 in a projected state upon decrease of the oil pressure in the oil passage 130, and a spring (not shown) disposed within the cylinder 134 for urging the plunger 136 in the projecting direction.

The exhaust valve driving device 122 includes an exhaust cam 140 formed on the cam shaft 124, an exhaust rocker arm 142 adapted to be rocked by the exhaust cam 140, a rocker shaft 146 which pivotally supports said exhaust rocker arm 142 and which is formed with an oil passage 144, and the valve stop mechanism 120 supported by the exhaust rocker arm 142.

The valve stop mechanism 120 includes a cylinder 148 fixed to the exhaust rocker arm 142, a plunger 150 slidably mounted within the cylinder 148, a stopper 152 which permits a sliding motion of the plunger 150 within the cylinder 148 when an oil pressure is exerted on the oil passage 144 and which holds the plunger 150 in a projected state upon decrease of the oil pressure in the oil passage 144, and a spring (not shown) mounted within the cylinder 148 for urging the plunger 150 in the projecting direction.

The oil passages 130 and 144 are connected to a pressure oil supply source (e.g. a lubricating oil pump) (not shown) of the engine through an oil passage 154 formed within a rocker cover. The supply and discharge of oil pressure to and from the oil passages 130 and 144 are effected by control of an electromagnetic control valve 200 as a cylinder number control means mounted in the oil passage 154. The electromagnetic control valve 200 is so constructed as to supply an oil pressure to the oil passages 130 and 144 upon energization of its solenoid coil (not shown) and stop supply of the oil pressure to those oil passages upon de-energization of the said solenoid coil.

In this third embodiment, moreover, the throttle valve opening control means M2 operates so that in the 2-cylinder operation the throttle valve 2 basically occupies its first opening position and when the engine speed is lower than the second preset speed N2 the throttle valve 2 moves toward its second opening position, while in the 4-cylinder operation the throttle valve 2 occupies its second opening position. To this end, in addition to generator control means GM, throttle valve opening switching means M1 and throttle valve opening control means M2, there is provided another throttle valve opening control means M3 to constitute a second control section of another intake air flow control means. That is, in addition to the three-way change-over valve 12 for switching between the negative pressure side and the atmosphere side, an electromagnetic change-over valve 28 is mounted in a by-pass passage 27 juxtaposed to the constriction 14.

The change-over valve 28 is constructed so that its plunger 28b thereof opens and closes the passage 27 by the action of its solenoid coil 28a and return spring 28c, the solenoid coil 28a of the change-over valve 28 being connected to a control unit 18'.

In addition to shaping circuit 19, f-V conversion circuit 20, comparators 21, 23, 25 transistors 22, 24, 39 and circuit including resistors R1–R3 and capacitor C1, the control unit 18' further includes a rest cylinder deciding circuit 29 which receives a load signal, a speed change gear position signal, an engine speed signal, a vehicular velocity signal, etc., decides which of the 2- and 4-cylinder operations is to be performed and outputs a high level signal for the 2-cylinder operation and a low level signal for the 4-cylinder operation, an AND circuit 30 which receives a signal from the rest cylinder deciding circuit 29, a timer circuit 31, inverters 32, 40 and a valve stop command circuit 33.

The AND circuit 30 is connected at one input terminal thereof to the output side of the comparator 21 and at the other input terminal thereof to the rest cylinder deciding circuit 29, and further connected at its output terminal to one input terminal of an AND circuit 34, whereby in the 2-cylinder operation the output side of the comparator 21 becomes high or low level according to its signal output, but in the 4-cylinder operation it is kept low.

The timer circuit 31 outputs a low level signal except during several seconds just after switching from the 4- to 2-cylinder operation during which it outputs a high level signal. Its output terminal is connected to the other input terminal of the AND circuit 34 through inverter 35 and also to one input terminal of an OR circuit 36.

The inverter 32 functions to invert a signal provided from the rest cylinder deciding circuit 29. Its output terminal is connected to the other input terminal of the OR circuit 36 and also to one input terminal of an OR circuit 37. To the other input terminal of the OR circuit 37 is connected the output terminal of the AND circuit 34, and the output terminal of the OR circuit is connected to the base of the transistor 22. Further, the output terminal of the OR circuit 36 is connected to the base of the transistor 38.

The transistor 38 is constituted as a switching transistor for turning on and off the solenoid coil 28a of the change-over valve 28.

The inverter 40 functions to invert a signal provided from the rest cylinder deciding circuit 29, and its output terminal is connected to the base of a transistor 41.

The transistor 41 functions to either connect the output side of the comparator 23 to ground to disable on-off control of the transistor 24, or disconnect it from ground to enable such control of the transistor 24.

The output terminal of the inverter 32 is connected to the base of the transistor 42. The transistor 42 functions to either connect the output side of the comparator 25 to ground to disable on-off control of the transistor 39, or disconnect it from ground to enable such control of the transistor 39, and it constitutes an operation control means of the generator control means.

The valve stop command circuit 33 outputs a command signal for controlling the electromagnetic control valve 200 upon receipt of a signal from the rest cylinder deciding circuit 29. In case the rest cylinder deciding circuit 29 decides that the 2-cylinder operation is to be performed, the valve stop command circuit 33 provides an energizing signal to the solenoid coil of the electromagnetic control valve 200, while when the circuit 29 decides that the 4-cylinder operation is to be performed, the circuit 33 provides a de-energizing signal to the said solenoid coil.

Furthermore, the passage 16 is provided with a constriction 14' whereby the release to the atmosphere can be done gradually as compared with the introduction of negative pressure.

Since the engine speed regulating system in this third embodiment is constructed as above, for example, when the accelerator pedal is not depressed in a standstill state of the vehicle and with the speed change gear in the neutral position, the output side of the rest cylinder deciding circuit 29 becomes high level so that the engine operates with two cylinders. As a result, by the action of the valve stop command circuit 33, the electromagnetic control valve 200 is energized and oil pressure is fed to the oil passages 130 and 144 to realize the 2-cylinder operation, and at the same time the transistor 38 turns off, the solenoid coil 28a of the change-over valve 28 becomes non-conductive and the change-over valve 28 closes the passage 27.

At this time, since the output sides of the inverters 40 and 32 are at low level, the transistors 41 and 42 are off, so that the transistors 24 and 39 are in a state capable of being turned on or off in response to high or low level of the output sides of the comparators 23 and 25, respectively.

Furthermore, if one input terminals of the AND circuits 30, 34 and OR circuit 37 become high or low level, their output sides become high or low level, thereby permitting the transistor 22 to turn on or off.

Upon decrease of the engine speed caused by application of the generator load or the like, the transistor 24 turns on rapidly and the voltage $V_p$ decreases, and at the same time the period of signal $V_s$ from the saw tooth wave signal generation circuit 26 becomes longer, so that the grounding time rate of the transistor 39 is increased and the generator load is diminished to the extent that the decrease of the engine speed can be prevented. Thus, for a short time just after application of the electric load L, the engine speed is regulated by control of generated energy.

Moreover, since the transistor 22 also turns on with decrease of the engine speed, the three-way change-over valve 12 switches to the negative pressure side and the throttle opener 8 operates. But, as previously noted, once the generator GE reaches a state capable of generating the consumed power, the engine speed increases with increase of the throttle valve opening, whereby the engine E is finally rotated at a speed in the vicinity of the second preset value N2 (about 740 rpm).

Furthermore, when the generator load is diminished and the engine assumes the standard idling state, the transistors 22, 24 and 29 are turned off, the G terminal of the regulator R is disconnected from ground and the three-way change-over valve 12 switches to the atmosphere side, so that the throttle valve 2 occupies its first opening position, thereby allowing the engine E to rotate at the third preset speed N3 (about 750 rpm).

Thus, in the 2-cylinder operation, control of the generated energy and that of the throttle valve opening are effected in cooperation on the basis of a detected variation in the engine speed, and therefore a stable operation of the engine can be ensured.

Next, from such a state of 2-cylinder operation, if the clutch pedal is depressed and the speed change gear is shifted to the low gear, ready for start, the output side of the rest cylinder deciding circuit 29 becomes low level so that the engine E is operated with four cylinders. As a result, by the action of the valve stop command circuit 33, the electromagnetic control valve 200 is de-energized to decrease the oil pressure in the oil passages 130 and 144, thereby realizing the 4-cylinder operation, and at the same time the transistors 38, 41 and 42 are immediately turned on.

In this state, since the output side of the comparator 25 is connected to ground, there occurs no change in its level, and the transistor 39 turns off. Thus, in this case, the control of generated energy involving connection to ground of the G terminal of the regulator R is not performed. Even without this control, there is little influence of the generator load in this case.

Moreover, since the transistor 41 is on, the output side level of the comparator 23 does not change, and the transistor 24 remains off, whereby the discharge of the capacitor C1 can be prevented while the generated energy control is not performed.

Furthermore, since the transistor 38 is on, the solenoid coil 28a of the change-over valve 28 is energized and the change-over valve 28 opens the passage 27.

At this instant, a high level signal is fed to the OR circuit 37 from the inverter 32, so that transistor 22 turns on and the three-way change-over valve 12 opens its negative pressure side, thus allowing the negative intake manifold pressure to be exerted rapidly on the chamber 8b of the throttle opener 8. As a result, the throttle valve 2 switches rapidly from its first opening position to its second opening position and the engine is rotated at a speed in the vicinity of a suitable idling speed N4 (e.g. 700 rpm) in the 4-cylinder operation without causing decrease of the engine speed in such a switching transition.

As will be apparent from the above description, this third embodiment is constructed so that in the 4-cylinder idle running the intake air passing through the throttle valve 2 which is in the second opening position is fed to each combustion chamber of the engine E whereby a suitable idling speed N4 is obtained.

The reason why the idling speed N4 in the 4-cylinder operation is set lower that the second and third preset speeds N2 and N3 as desired in the 2-cylinder operation is that in the 2-cylinder operation it is desirable to set the idling speed rather high to prevent the occurrence of vibration, while in the 4-cylinder operation it is desirable to set the idling speed rather low to minimize fuel consumption.

And when switching from the 2-cylinder idle running to the 4-cylinder idling, the speed of the engine E is controlled from the relatively high N2 and N3 to the relatively low N4. At this time, the throttle valve 2 is moved in the opening direction to increase the amount of intake air. Because, the pumping loss of the engine E is larger in the 4-cylinder operation than in the 2-cylinder operation and therefore if the amount of intake air is the same during idle running, the engine speed becomes higher in the 2-cylinder operation than in the 4-cylinder operation. For this reason, with the amount of intake air which attained the speeds N2 and N3 in the 2-cylinder idle running, it is impossible to attain even the speed N4 lower than the speeds N2 and N3 in the 4-cylinder idle running, and therefore the opening of the throttle valve 2 is increased to increase the amount of intake air.

As will be apparent from what has just been mentioned above, when switching from the 2- to 4-cylinder operation during idle running, it is necessary to increase the amount of intake air. Otherwise, decrease of the engine speed and otherwise stall of the engine would result. [But actually, just after switching to the 4-cylinder operation, the load within the intake manifold is in a state of low negative pressure (e.g. 400 mmHg) in the 2-cylinder operation, therefore the engine speed increases for a moment and thereafter decreases rapidly as the negative pressure within the intake manifold approaches a high value (e.g. 500 mmHg) in the 4-cylinder operation.] In this third embodiment, therefore, the intake air flow control means M3 is provided to effect control for increasing the opening of the throttle valve 2 quickly when switching from the 2- to 4-cylinder operation to thereby prevent decrease of the engine speed in such switching transition. (Actually, because of a slight response delay of the throttle opener 8, the increase of the engine speed just after the switching is kept to a minimum.) If the speed change gear is again shifted to the neutral position from such a state of 4-cylinder idle running, the output side of the rest cylinder deciding circuit 29 becomes high level so that the engine again operates with two cylinders.

As a result, the 2-cylinder operation is realized by the action of the valve stop command circuit 33 and at the same time the transistors 22 and 38 are turned off and on, respectively, for several seconds just after the switching by the action of the timer circuit 31, so that the change-over valve 12 is opened to the atmosphere side and the change-over valve 28 opens the by-pass passage 27.

Consequently, the negative pressure within the chamber 8b of the throttle opener 8 is gradually released to the atmosphere side through the constriction 14'. As a result, in this switching transition, the throttle valve 2 gradually switches from its second to its first opening position, and also in this case it is possible to perform the 2-cylinder idle running without causing decrease of the engine speed in such a switching transition.

Such a gradual siwtching does not cause decrease of the engine speed and this is for the following reason. An appropriate negative pressure within the intake manifold (e.g. 500 mmHg) in the 4-cylinder idle running is larger than that (e.g. 400 mmHg) in the 2-cylinder idling, therefore if switching is made rapidly from the 4- to 2-cylinder idle running without using the constriction 14', the negative intake manifold pressure cannot undergo a sudden change, so according to the example shown above, the 2-cylinder operation is performed at a negative intake manifold pressure of about 500 mmHg. This state results in deficiency of torque, causing decrease of the engine speed and stall of the engine in the worst case.

To eliminate such inconvenience, the constriction 14' is provided in the atmosphere side passage 16. By the provision of the constriction 14', the negative pressure control signal within the throttle opener 8 is gradually released to the atmosphere side, and therefore switching is done gradually from the second to the first opening position. Thus, a smooth switching can be attained while minimizing the decrease of the engine speed in the switching transition.

An excess constriction 14' is not desirable because it would cause increase of overshoot, so the constriction 14' is set at an appropriate throttling amount.

In several seconds or more after such switching operation, the transistors 22 and 39 are turned on or off according to a change in engine speed caused by a variation in load as previously noted, whereby the generated energy control and the intake air flow control through control of the throttle valve opening are again performed as necessary in the 2-cylinder operation. As a result, a stable operation of the engine can be ensured.

According to the third embodiment described above, in the 2-cylinder idle running the engine speed, which is apt to vary in such operation, is sure to be stabilized by cooperation of the generated energy control and the intake air flow control, and in the 4-cylinder idle running wherein the engine speed is relatively stable, the generated energy control is discontinued to protect the battery B and at the same time the amount of intake air is increased and the engine speed is regulated to the fourth preset value N4 suitable for the 4-cylinder idle running. Thus, the engine speed during idling of the cylinder number control type engine can be regulated in an appropriate manner.

According to this third embodiment, moreover, the throttle valve opening control means M3 is provided, whereby the opening motion of the throttle valve 2 is performed quickly when switching from the 2- to 4-cylinder operation, while when switching from the 4- to 2-cylinder operation the closing motion of the throttle valve 2 is performed gradually, so that the variation in engine speed can be kept to a minimum during such cylinder number switching operation.

In the above third embodiment, moreover, if the decrease of the engine speed particularly in the switching transition from the 2- to 4-cylinder operation is negligible, then even without provision of the throttle valve opening control means M3, control is made so that by the action of the throttle valve opening control means M2, in the absence of the electric load L and in the 2-cylinder idle running the throttle valve 2 occupies its first opening position and the engine speed becomes the third preset speed N3 higher than the second preset speed N2, while in the 4-cylinder idle running the throttle valve 2 takes its second opening position and the engine speed becomes the fourth preset speed N4 lower than the second preset speed N2.

Figure 10:
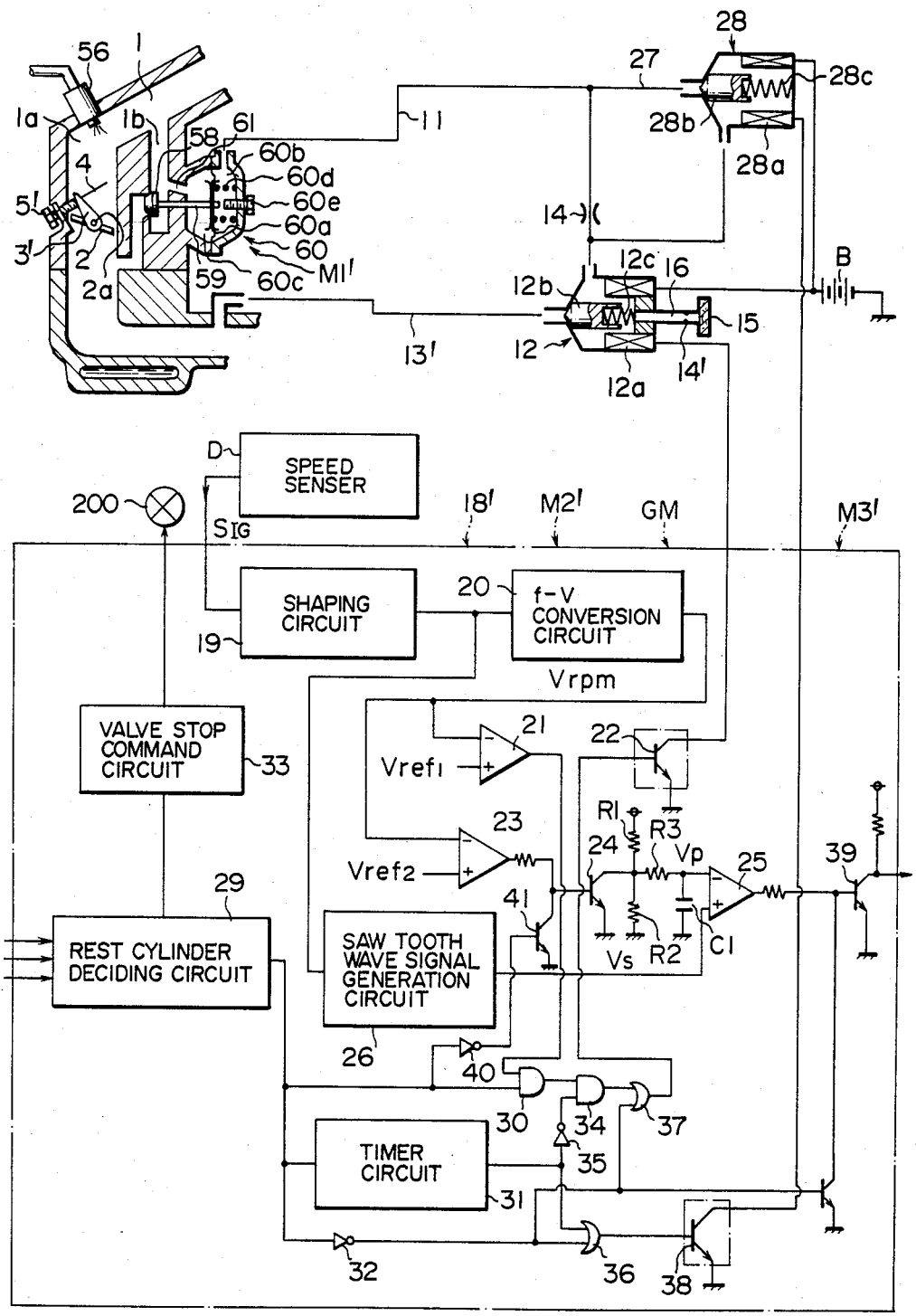
FIG. 10 illustrates schematically and typically the structure of a principal portion of a fourth embodiment of the present invention.

A fourth embodiment of the present invention will be described hereinunder with reference to FIG. 10.

This fourth embodiment, like the above third embodiment, also relates to a speed regulating system for a cylinder number control type engine, and the difference thereof from the third embodiment resides in that the intake air flow adjusting valve is constituted by a by-pass valve 58 mounted in the by-pass intake passage portion 1b which by-passes the trottle valve 2, and this construction is the same as in the foregoing second embodiment. In this fourth embodiment, therefore, the by-pass valve opening control means M2' operates so that in the 2-cylinder operation the by-pass valve 58 basically occupies its minimum opening position and moves toward its maximum opening position when the engine speed is lower than the second preset speed N2, and in the 4-cylinder operation the by-pass valve 58 occupies its maximum opening position. In order to realize this control, there is provided a by-pass valve opening control means M3' having the same construction as that of the throttle valve opening control means M3 used in the above third embodiment. Moreover, in this fourth embodiment, like the second embodiment, there are provided by-pass valve opening switching means M1' and by-pass valve opening control means M2', and the construction of the intake system of engine is about the same as in the second embodiment. Other constructions are almost the same as in the third embodiment. In FIG. 10, the same or substantially the same members in construction as in the first, second and third embodiments are indicated at the same reference numerals or marks.

According to the construction just described above, during 2-cylinder idle running, the transistors 41 and 42 are off, the generator is in a state capable of being controlled its power generation, and the three-way changeover valve 12 is ready to operate through the transistor 22 according to the output of the comparator 21.

In the absence of the electric load L during 2-cylinder idle running, the by-pass valve 58 is located in its minimum opening position, namely, a fully closed position, and the engine rotates at the third preset speed N3. From this state, if the electric load L or the like is imposed on the engine and the engine speed decreases, then as in the second embodiment the transistor 39 turns on and control of generated energy for the generator GE is performed, while on the basis of the action of the three-way change-over valve 12 the pressure responsive unit 60 operates to move the by-pass valve 58 toward the opening side until the engine E finally is operated at a speed near the second preset value N2. When the engine load is diminished, the engine speed increases and the transistor 39 is turned off to stop the generated energy control, and at the same time the by-pass valve 58 is moved to its fully closed position by the operation of the three-way change-over valve 12 and pressure responsive unit 60. As a result, the speed of the engine E reverts to the third preset value N3.

Thus, in the 2-cylinder operation, the generated energy control and the by-pass valve opening control are effected in cooperation on the basis of a detected variation of the engine speed, therefore a stable operation of the engine can be ensured.

Next, if switching is made from such 2-cylinder idling state to the 4-cylinder idling state, then as in the third embodiment the transistor 39 is kept off and the generated energy control is held in a state of inhibition, while the passage 27 is opened thereby allowing the negative manifold pressure to act on the chamber 60b of the pressure responsive unit 60 rapidly. (In the 4-cylinder operation, the transistor 22 is kept on at all times with a signal from the inverter 32 and the three-way changeover valve 12 opens at the passage 13' side.) As a result, the by-pass valve 58 changes in position quickly up to its maximum opening position to increase the amount of intake air, so that the engine is rotated at a speed near the idling speed N4 (e.g. 700 rpm) suitable for the 4-cylinder idling state without causing decrease of the engine speed in such switching transition.

As will be appreciated from the above description, this fourth embodiment is constructed so that in the 4-cylinder idle running the intake air passing through the throttle valve 2 located in the minimum opening position and the intake air passing through the by-pass valve 58 located in the maximum opening position are fed to each combustion chamber of the engine E to thereby obtain the suitable idling speed N4.

When switching is made from such 4-cylinder idling state again to the 2-cylinder idling state, the transistor 22 is turned off and the transistor 38 on for only a time period set by the timer circuit 31, so that the change-over valve 12 is opened to the atmosphere side and the change-over valve 28 opens the by-pass passage 27, thereby allowing the negative pressure within the chamber 60b of the pressure responsive unit 60 to be released gradually to the atmosphere side through the constriction 14'. As a result, in this switching transition, the by-pass valve 58 gradually switches from its maximum to its minimum opening position, thereby permitting 2-cylinder idle running without causing decrease of the engine speed.

Then, with a lapse of time more than a time period set by the timer circuit 31 after such switching stage, the transistor 22 and 39 come to turn on or off according to a change in engine speed caused by a variation in load, thereby allowing both the generated energy control and the intake air flow control through control of the by-pass valve opening to be performed again as necessary in the 2-cylinder operation. As a result, a stable operation of the engine can be ensured. Thus, this fourth embodiment attains about the same effect as in the foregoing third embodiment.

The third and fourth embodiments described above are applicable not only to 4-cylinder type cylinder number controlled engines but also to other multi-cylinder type cylinder number controlled engines.

Moreover, in the first and third embodiments described above the pressure responsive type throttle opener 8 was used as the throttle valve opening switching means M1, and in the second and fourth embodiments described above the pressure responsive unit 60 was used as the by-pass valve opening switching means M1', but these switching means M1 and M1' may employ an electric motor such as a pulse motor.

Furthermore, although in the second and fourth embodiments described above, the upstream end of the by-pass intake passage portion 1b and that of the main intake passage portion 1a were let join together and communicate with the atmosphere through a single air cleaner, those upstream ends may be let communicate with the atmosphere through separate air cleaners. In this case, the amount of intake air fed to each combustion chamber is calculated by measuring only the amount of intake air fed to each combustion chamber is calculated by measuring only the amount of intake air passing through the main intake passage portion 1a by means of an intake air flow meter and correcting the result of such measurement according to the state of operation of the by-pass valve 8, and on the basis of the calculated value the amount of fuel ejected from the fuel injection valve 56 is determined.

Moreover, although in the first through fourth embodiments described above, the throttle valve 2 and the accelerator pedal operated by human power are interconnected mechanically through the wire 4, the present invention, of course, is applicable also to an engine of a construction such that mechanically the throttle valve and the accelerator pedal are disconnected from each other, a depressed amount of the accelerator pedal and other information on driving condition are detected electrically, then a microcomputer computes an opening positon on the basis of the result of such detection, and an actuator controls the throttle valve to let the latter occupy the said opening position.

Furthermore, all the functions of the control units 18 and 18' performed by hardware may be replaced by software.

Moreover, in the case of a system wherein the battery B has a sufficiently large capacity and can be fully charged during vehicular travelling even after discharge during idle running, it is possible to regulate the engine speed by only control of generated energy without control of the throttle valve opening or control of the amount of intake air through control of the throttle valve or the by-pass valve opening.

What is claimed is:

1. An engine speed regulating system for an engine having a plurality of cylinders comprising a generator driven by the engine for charging a battery, speed detecting means for detecting the speed of said engine, a generator control means which, when the speed of said engine becomes lower than a preset speed which is not higher than an idling speed of said engine, outputs a control signal for controlling power generation of said generator on the basis of a signal supplied from said speed detecting means, a cylinder stop means associated with part of said plural cylinders for stopping the operation of the associated said part of said cylinders, a cylinder number control means which provides to said cylinder stop means a control signal for switching between an engine operation with all of the cylinders of said engine working and an engine operation in which said part of the cylinders is not in operation while the remainder of the cylinders is in operation, and an operation control means for controlling the operation of said generator control means in response to the operation of said cylinder number control means, said operation control means being operable to make said generator control means operate when the engine operates with said part of the cylinders.

2. An engine speed regulating system according to claim 1, wherein during idle running of said engine, said cylinder number control means provides to said cylinder stop means a control signal for switching between idle running with said part of cylinders and idle running with all said cylinders, and said preset speed is not higher than an idling speed in the operation with said part of cylinders.

3. An engine speed regulating system according to claim 2, wherein there are further provided an intake air flow adjusting means, provided in an intake passage through which air is supplied to the combustion chamber in each cylinder of said engine, for adjusting the amount of air passing through said intake passage, and intake air flow control means which operates said intake air flow adjusting means in response to the operation of said cylinder number control means to increase or decrease said amount of intake air during idle running, said intake air flow control means being adapted to control said intake air flow adjusting means so that the amount of intake air during idle running with said part of cylinders is smaller than that during idle running with all said cylinders and so that the engine speed during idle running with said part of cylinders is higher than that during idle running with all said cylinders, and wherein during idle running with all said cylinders, said operation control means renders said generator control means non-operative.

4. An engine speed regulating system according to claim 5, wherein said intake air flow adjusting means includes an intake air flow adjusting valve mounted in said intake passage, and said intake air flow control means includes a valve opening switching means for switching the opening of said intake air flow adjusting valve and a control portion which provides an operating signal to said valve opening switching means in response to the operation of said cylinder number control means, said valve opening switching means being operative to let said intake air flow adjusting valve occupy a first idling opening position in response to said operating signal provided from said control portion during idle running with said part of cylinders and to let said intake air flow control valve occupy a second opening position larger than said first opening position in response to said operating signal during idle running with all said cylinders.

5. An engine speed regulating system according to claim 4, wherein said intake air flow adjusting valve comprises a throttle valve mounted in said intake passage.

6. An engine speed regulating system according to claim 4, wherein said intake passage comprises a main intake passage portion which conducts intake air to each said combustion chamber through a throttle valve mounted therein, and a by-pass intake passage portion which conducts intake air to each said combustion chamber while by-passing said throttle valve, said by-pass intake passage portion joining at a downstream end thereof said main intake passage portion at a downstream side with respect to said throttle valve, and wherein said intake air flow adjusting valve comprises a by-pass valve mounted in said by-pass intake passage portion.

7. An engine speed regulating system according to claim 5, wherein said generator control means includes a control signal outputting means which outputs said power generation control signal intermittently, and a signal output control means which controls said control signal outputting means so that the output time of said power generation control signal becomes longer with increase of a deviation between the speed of said engine when it is lower than said preset speed and said preset speed.

8. An engine speed regulating system according to claim 1, wherein said generator control means includes a control signal outputting means which outputs said power generation control signal intermittently when a deviation between the speed of said engine when it is lower than said preset speed and said preset speed is within a preset value and which outputs said power generation control signal continuously when said deviation is larger than said preset value.

9. An engine speed regulating system comprising a generator driven by an engine for charging a battery, a speed detecting means for detecting the speed of said engine, a generator control means which, when the speed of said engine becomes lower than a first preset speed, outputs a control signal for controlling power generation of said generator associated with said engine on the basis of a signal provided from said speed detecting means, an intake air flow adjusting means mounted in an intake passage of said engine for adjusting the amount of intake air fed to each combustion chamber of said engine, and an intake air flow control means which, on the basis of said signal from said speed detecting means, operates said intake air flow adjusting means so as to increase said amount of intake air when the speed of said engine is lower than a second present speed and to decrease said amount of intake air when the speed of said engine becomes higher than said second preset speed, in which regulation of the speed of said engine is performed by cooperation of said generator control means and said intake air flow control means.

10. An engine speed regulating system according to claim 9 wherein said first preset speed is not higher than said second preset speed.

11. An engine speed regulating system according to claim 10, wherein said second preset speed corresponds to a target idling speed.

12. An engine speed regulating system according to claim 11, wherein said intake air flow adjusting means includes an intake air flow adjusting valve mounted in said intake passage, and said intake air flow control means includes a valve opening switching means for switching the opening of said intake air flow adjusting valve and a control portion which, on the basis of said signal from said speed detecting means, provides an operating signal to said valve opening switching means to control said amount of intake air, said operating signal being provided from said control portion to said valve opening switching means so as to decrease the opening of said intake air flow adjusting valve when the speed of said engine is higher than said second preset speed and to increase the opening of said intake air flow adjusting valve when said engine speed is lower than said second preset speed.

13. An engine speed regulating system according to claim 2, wherein said intake air flow control valve comprises a throttle valve mounted in said intake passage.

14. An engine speed regulating system according to claim 12, wherein said intake passage comprises a main intake passage portion which conducts intake air to each said combustion chamber through a throttle valve mounted therein, and a by-pass intake passage portion which conducts intake air to each said combustiion chamber while by-passing said throttle valve, said by-pass intake passage portion joining at a downstream end thereof said main intake passage portion at a downstream side with respect to said throttle valve, and wherein said intake air flow adjusting valve comprises a by-pass valve mounted in said by-pass intake passage portion.

15. An engine speed regulating system according to claim 10, wherein said engine is provided with a plurality of cylinders, wherein there are further provided a cylinder stop means associated with part of said plural cylinders for stopping the operation of said part of cylinders, and a cylinder number control means which provides to said cylinder stop means a control signal for switching between an engine operation with all the cylinders of said engine and an engine operation with part of cylinders in which part of cylinders is or are not in operation while the remaining cylinder or cylinders is or are in operation, said cylinder number control means providing to said cylinder stop means a control signal for allowing an idle running with said part of cylinders to be performed during idle running of said engine, and wherein said second preset speed corresponds to a target engine speed during idle running with said part of cylinders.

16. An engine speed regulating system according to claim 15, characterized by further including an operation control means for controlling the operation of said generator control means in response to the operation of said cylinder number control means, said operation control means being adapted to operate said generator control means when said engine is in operation with said part of cylinders.

17. An engine speed regulating system according to claim 9, wherein said generator control means includes a control signal outputting means which outputs said power generation control signal intermittently, and a signal output control means which controls said control signal outputting means so that the output time of said power generation control signal becomes longer with increase of a deviation between speed of said engine when it is lower than said first preset and said first preset speed.

18. An engine speed regulating system according to claim 9, wherein said generator control means includes a control signal outputting means which outputs said power generation control signal intermittently when a deviation between the speed of said engine when it is lower than said first preset speed and said first preset speed is within a preset value and which outputs said power generation control signal continuously when said deviation is larger than said first preset value.

19. An engine speed regulating system according to claim 9, wherein said second preset speed corresponds to a target idling speed.

20. An engine speed regulating system according to claim 9, wherein said engine is provided with a plurality of cylinders, wherein there are further provided a cylinder stop means associated with part of said plural cylinders for stopping the operating of said part of cylinders, and a cylinder number control means which provides to said cylinder stop means a control signal for switching between an engine operation with all the cylinders of said engine and an engine operation with part of cylinders in which part of cylinders is or are not in operation while the remaining cylinder or cylinders is or are in operation, said cylinder number control means providing to said cylinder stop means a control signal for allowing an idle running with said part of cylinders to be performed during idle running of said engine, and wherein said second preset speed corresponds to a target engine speed during idle running with said part of cylinders.

21. An engine speed regulating system comprising a generator driven by an engine for chargine a battery, a speed detecting means for detecting the speed of said engine, a generator control means which, when the speed of said engine becomes lower than a first preset speed below an idling speed, outputs a control signal for controlling power generation of said generator on the basis of a signal provided from said speed detecting means, an intake air flow adjusting means mounted in an intake passage of said engine for adjusting the amount of intake air fed to each combustion chamber of said engine, and an intake air flow control means which operates said intake air flow adjusting means to increase said amount of intake air when the speed of said engine becomes lower than a second preset speed below said idling speed, in which regulation of the engine speed during idle running of said engine is performed by cooperation of said generator control means and said intake air flow control means.

22. An engine speed regulating system according to claim 21, wherein said engine is provided with a plurality of cylinders, wherein there are further provided a cylinder stop means associated with part of said plural cylinders for stopping the operation of said part of cylinders, and a cylinder number control means which provides to said cylinder stop means a control signal for switching between an engine operation with all the cylinders of said engine and an engine operation with part of cylinders in which part of cylinders is or are not in operation while the remaining cylinder or cylinders is or are in operation, said cylinder number control means providing to said cylinder stop means a control signal for allowing an idle running with said part of cylinders to be performed during idle running of said engine, wherein said first and second preset speeds are not higher than an idling speed during operation with said part of cylinders, and wherein regulation of the engine speed during idle running with said part of cylinders is performed by cooperation of said generator control means and said intake air flow control means.

23. An engine speed regulating system according to claim 22, wherein said cylinder number control means provides to said cylinder stop means a control signal for switching between an idle running with said part of cylinders and an idle running with all said cylinders, during idling of said engine, wherein there is provided another intake air flow control means for controlling said amount of intake air by operating said intake air flow adjusting means in preference to said intake air flow control means when said cylinder number control means issues a control signal for idle running with all said cylinders in response to the control operation of said cylinder number control means, and wherein an amount of intake air which affords an engine speed for idle running with all said cylinders during said idle running with all said cylinders is fed to each said combustion chamber by the action of said another intake air flow control means.

24. An engine speed regulating system according to claim 23, wherein said intake air flow adjusting means includes an intake air flow adjusting valve mounted in said intake passage, said intake air flow control means includes a valve opening switching means for switching the opening of said intake air flow adjusting valve and a first control portion which provides an operating signal to said valve opening switching means to control said amount of intake air on the basis of the signal provided from said speed detecting means, said another intake air flow control means includes said valve opening switching means and a second control portion which provides an operating signal to said valve opening switching means in preference to said first control portion to control said amount of intake air in response to the control operation of said cylinder number control means, and wherein during idle running with said part of cylinders, said intake air flow adjusting valve basically occupies a first opening position, and when the speed of said engine is lower than said second preset speed, said first control portion provides an operating signal to said valve opening switching means to operate said intake air flow adjusting valve toward an opening side to increase said amount of intake air, while during idle running with all said cylinders, said second control portion provides an operating signal to said valve opening switching means to let said intake air flow adjusting valve occupy a second opening position larger than said first opening position.

25. An engine speed regulating system according to claim 24, wherein said intake air flow adjusting valve comprises a throttle valve mounted in said intake passage.

26. An engine speed regulating system according to claim 24, wherein said intake passages comprises a main intake passage portion which conducts intake air to each said combustion chamber through a throttle valve mounted therein, and a by-pass intake passage portion which conducts intake air to each said combustion chamber while by-passing said throttle valve, said by-pass intake passage portion joining at a downstream end thereof said main intake passage portion at a downstream portion with respect to said throttle valve, and wherein said intake air flow adjusting valve comprises a by-pass valve mounted in said by-pass intake passage portion.

27. An engine speed regulating system according to claim 21, wherein said generator control means includes a control signal outputting means which outputs said power generation control signal intermittently, and a signal output control means which controls said control signal outputting means so that the output time of said power generation control signal becomes longer with increase of a deviation between the speed of said engine when it is lower than said first preset speed and said first preset speed.

28. An engine speed regulating system according to claim 21, wherein said generator control means includes a control signal outputting means which outputs said power generation control signal intermittently when a deviation between the speed of said engine when it is lower than said first preset speed and said first preset speed is within a preset value and which outputs said power generation control signal continuously when said deviation is larger than said preset value.

* * * * *

UNITED STATES PATENT AND TRADEMARK OFFICE
CERTIFICATE OF CORRECTION

PATENT NO. : 4,520,272

DATED : May 28, 1985

INVENTOR(S) : DANNO et al

It is certified that error appears in the above-identified patent and that said Letters Patent is hereby corrected as shown below:

In the heading under:

"[30] Foreign Application Priority Date".
Add:
-- Dec. 24, 1982 [JP] Japan  57-229538--

Signed and Sealed this

Twentieth Day of August 1985

[SEAL]

Attest:

DONALD J. QUIGG

Attesting Officer

Acting Commissioner of Patents and Trademarks